(12) United States Patent
Moskovich

(10) Patent No.: US 6,509,937 B1
(45) Date of Patent: Jan. 21, 2003

(54) HIGH PERFORMANCE PROJECTION TELEVISION LENS SYSTEMS

(75) Inventor: Jacob Moskovich, Cincinnati, OH (US)

(73) Assignee: U.S. Precision Lens Incorporated, Cincinnati, OH (US)

( * ) Notice: Subject to any disclaimer, the term of this patent is extended or adjusted under 35 U.S.C. 154(b) by 0 days.

(21) Appl. No.: 09/462,542

(22) PCT Filed: Jul. 10, 1998

(86) PCT No.: PCT/US98/14386

§ 371 (c)(1),
(2), (4) Date: Jan. 10, 2000

(87) PCT Pub. No.: WO99/03006

PCT Pub. Date: Jan. 21, 1999

Related U.S. Application Data

(60) Provisional application No. 60/052,322, filed on Jul. 11, 1997.

(51) Int. Cl.[7] .............................. H04N 9/31; G02B 9/00
(52) U.S. Cl. ........................ 348/781; 359/649; 359/650
(58) Field of Search ................................ 348/781, 782, 348/784, 779, 749; 359/649, 650, 708, 781, 756, 763, 771, 770; H04N 9/31, 5/74

(56) References Cited

U.S. PATENT DOCUMENTS

| | | | | |
|---|---|---|---|---|
| 4,300,817 A | * | 11/1981 | Betensky | 359/651 |
| 4,348,081 A | * | 9/1982 | Betensky | 359/650 |
| 4,526,442 A | * | 7/1985 | Betensky | 359/651 |
| 4,682,862 A | * | 7/1987 | Moskovich | 359/649 |
| 4,697,892 A | * | 10/1987 | Betensky | 359/650 |
| 4,755,028 A | * | 7/1988 | Moskovich | 359/650 |
| 4,776,681 A | * | 10/1988 | Moskovich | 359/649 |
| 5,200,814 A | * | 4/1993 | Hirata et al. | 348/745 |
| 5,272,540 A | * | 12/1993 | Hirata et al. | 348/781 |
| 5,296,967 A | * | 3/1994 | Moskovich et al. | 359/649 |
| 5,329,363 A | * | 7/1994 | Moskovich | 348/781 |
| 5,455,713 A | * | 10/1995 | Kreitzer | 359/649 |
| 5,633,757 A | * | 5/1997 | Park | 359/649 |
| 5,659,424 A | * | 8/1997 | Osawa et al. | 359/649 |
| 5,933,280 A | * | 8/1999 | Osawa et al. | 359/649 |
| 6,081,387 A | * | 6/2000 | Takahashi et al. | 359/649 |
| 6,130,786 A | * | 10/2000 | Osawa et al. | 359/649 |

* cited by examiner

*Primary Examiner*—Michael H. Lee
(74) *Attorney, Agent, or Firm*—Maurice M. Klee

(57) ABSTRACT

Projection lens systems for use in CRT projection televisions are provided. The lens systems include a negative lens unit (U4) which is associated with the CRT during use of the lens system and four lens elements (L1, L2, L3, CR) on the image side of the negative lens unit (U4). Three of those lens elements (L1, L2, L3) are arranged as follows from the long conjugate to the short conjugate of the lens system: a first lens element (L1) which has a weak optical power and at least one aspherical surface; a second lens element (L2) which has a positive focal length and provides most of the optical power of the lens system; and a third lens element (L3) which has a positive focal length and at least one aspherical surface. The last lens element of the system is a corrector lens element (CR) which is located adjacent to the second lens element (L2) and has a weak optical power, at least one aspherical surface, and is substantially flat. The lens systems achieve wide fields of view, low f-numbers, and low levels of thermal focus drift.

10 Claims, 7 Drawing Sheets

HIGH PERFORMANCE PROJECTION TELEVISION LENS SYSTEMS

CROSS REFERENCE TO RELATED PROVISIONAL APPLICATION

This application claims the benefit under 35 USC §119(e) of U.S. Provisional Application No. 60/052,322 filed Jul. 11, 1997, the content of which in its entirety is hereby incorporated by reference.

BACKGROUND OF THE INVENTION

1. Field of the Invention

This invention relates to projection lens systems for use in projection televisions and, in particular, to high performance projection lens systems which 1) have a wide field of view, 2) have a high numerical aperture, and 3) are thermally-stabilized so that the focus of the system does not substantially change between room temperature and the system's operating temperature.

2. Description of the Prior Art

Projection lens systems for CRT projection televisions have undergone continuing development during the past fifteen years or so. As a result, many of today's CRT projection televisions are equipped with fast lens systems which have f-numbers of ~f/1 and which provide semi-fields of view of 25° and wider.

As is well-known, color images are obtained for television systems of this type by combining images from three color CRTs, i.e., a red CRT, a green CRT, and a blue CRT. Since the emission spectra of the CRTs are relatively narrow, for many applications, lens systems uncorrected for color can be used.

When the field of view does not exceed a half-angle of about 25°, the lens system may consist of just three components and still provide a sufficiently high level of image quality. A typical configuration has a weak aspherical element on the image side of the lens system, followed by a strong positive power element, followed in turn by a strong negative element in close proximity to the CRT. See, for example, Betensky, U.S. Pat. Nos. 4,300,817, 4,348,081, and 4,526,442.

For this configuration, the aspherical first element provides most of the correction of spherical aberration and other aperture dependent aberrations, the positive element in combination with the relative position of the aperture stop of the lens system allows for the astigmatism to be corrected, and the negative element close to CRT provides correction for the field curvature of the lens.

When the focal length of the lens system is shortened to make the projection television more compact, the field coverage of the lens system must be increased. When the half-angle of view is increased to about 28°, a three element form generally cannot provide an appropriately high level of optical performance. To address this problem, a fourth element has been added between the strong positive and the strong negative elements of the three component configuration. See Betensky, U.S. Pat. No. 4,697,892, and Moskovich, U.S. Pat. Nos. 4,682,862, 4,755,028, and 4,776, 681. This additional element usually does not have much optical power; however, it must have an aspherical surface to correct for aperture dependent off-axis aberrations like sagittal oblique spherical and coma. Four element configurations have been used effectively up to half-angles of 33° to 35°.

Five element configurations are also known in the art. See the Moskovich '862 and '681 patents, supra. In some systems, six element configurations have been used. See Moskovich, U.S. Pat. Nos. 5,296,967 and 5,329,363.

The performance of existing projection lenses for CRT projection televisions and, in particular, the widely used four element projection lenses, needs to be improved to meet the ever increasing demands on projection television sets. With more computer-generated data as well as with more information being shown around the periphery of the screen, the degradation of the image quality of the lens across the whole field of view must be minimized. At the same time, the speed of the lens must be kept at about f/1.0 and the fall-off of image brightness toward the edges of the screen must be minimized. In addition, the higher information content of the image makes the focus drift due to changes in the operating temperature of the TV set more noticeable, and thus the thermal stability of the optical performance of the projection lens becomes more important.

SUMMARY OF THE INVENTION

In view of the foregoing state of the art, it is an object of the present invention to provide improved projection lens systems for use in projection televisions. More particularly, it is an object of the invention to provide projection lens systems which (1) are capable of covering a semi-field of view of at least 33° at a f-number of less than 1.2 for a long conjugate of infinite length, (2) are substantially resistant to thermal drift, and (3) provide an image quality suitable for the display of computer-generated data over substantially the entire field of the projected image. Further, it is an object of the invention to provide projection lens systems having the foregoing properties which can be manufactured at a reasonable cost.

To achieve the foregoing and other objects, the invention provides a projection lens system for use in combination with a cathode ray tube which from its long conjugate to its short conjugate consists of:

(a) a first lens element (L1) which has (i) a weak optical power and (ii) at least one aspherical surface;

(b) a second lens element (L2) which (i) has a positive focal length $f_2$ and (ii) provides most of the optical power of the lens system, i.e., $f_2/f_0$ is less than 1.3 where $f_0$ is the focal length of the projection lens system in combination with the CRT tube;

(c) a third lens element (L3) which has (i) a positive focal length $f_3$ and (ii) at least one aspherical surface; and (d) a fourth lens unit (U4) which is associated with the CRT during use of the lens system and (i) has a strong negative optical power and (ii) provides most of the correction of the field curvature of the lens system;

and which further consists of:

(e) a corrector lens element (CR) which is located adjacent to the second lens element and has (i) a weak optical power and (ii) at least one aspherical surface;

wherein:

$$2 < f_3/f_2 < 4, \quad (1)$$

$$|f_c/f_3| > 3, \text{ and} \quad (2)$$

$$\max|z|/r_{ca} < 0.15 \quad (3)$$

where $f_c$ is the focal length of the corrector lens element, $\max|z|$ is the maximum sag of the two surfaces of the corrector lens element, and $r_{ca}$ is the clear aperture radius of the surface having the maximum sag.

As can be seen from relationships (1) and (2), the corrector lens element has a significantly longer focal length than the third lens element, and the third lens element has a significantly longer focal length than the second lens element, i.e., the power element. The corrector lens element is thus truly a corrector in that it has essentially no power compared to the other components of the system.

Relationship (3) relates to the manufacturability of the lens systems of the invention and, in particular, to the manufacturability of the corrector lens element. To simplify the process of manufacturing of plastic elements, and, thereby, to improve the ability to make the elements more accurately at a competitive price, it is desirable to have a general element shape which is approximately flat. If an element does not have much optical power but has a strong meniscus shape it is, generally speaking, more difficult to manufacture than an element of the same power but with flatter surfaces. The clear aperture of the corrector element located adjacent to the second lens element is determined by a full axial beam. Therefore, this element is more sensitive to manufacturing tolerances and must be made well. To make this task easier the overall element shape should have a $\max|z|/r_{ca}$ ratio which is less than 0.15, preferably less than 0.14, and most preferably less than 0.13.

In certain preferred embodiments of the invention, the lens system also satisfies the relationship:

$$t_c/t_2 < 0.35, \quad (4)$$

where $t_c$ is the distance between the corrector lens element and the second lens element and $t_2$ is the thickness of the second lens element. Preferably, the $t_c/t_2$ ratio is less than 0.15.

The term "weak" is used herein to describe an element whose focal length has a magnitude which is at least about 5 times $f_0$, and the term "strong" is used to describe an element or unit whose focal length has a magnitude which is less than about 3 times $f_0$.

Figure 1:
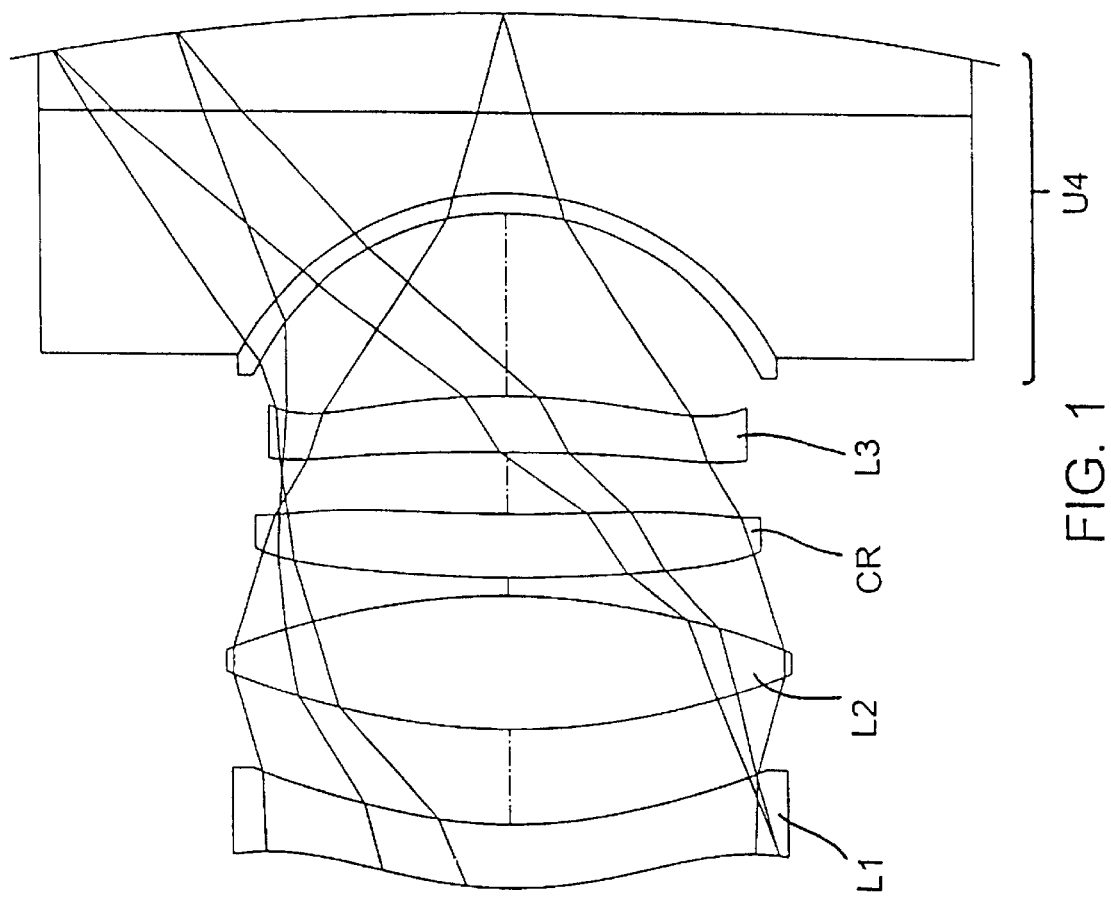
FIGS. 1–6 are schematic side views of lens systems constructed in accordance with the invention.
Figure 2:
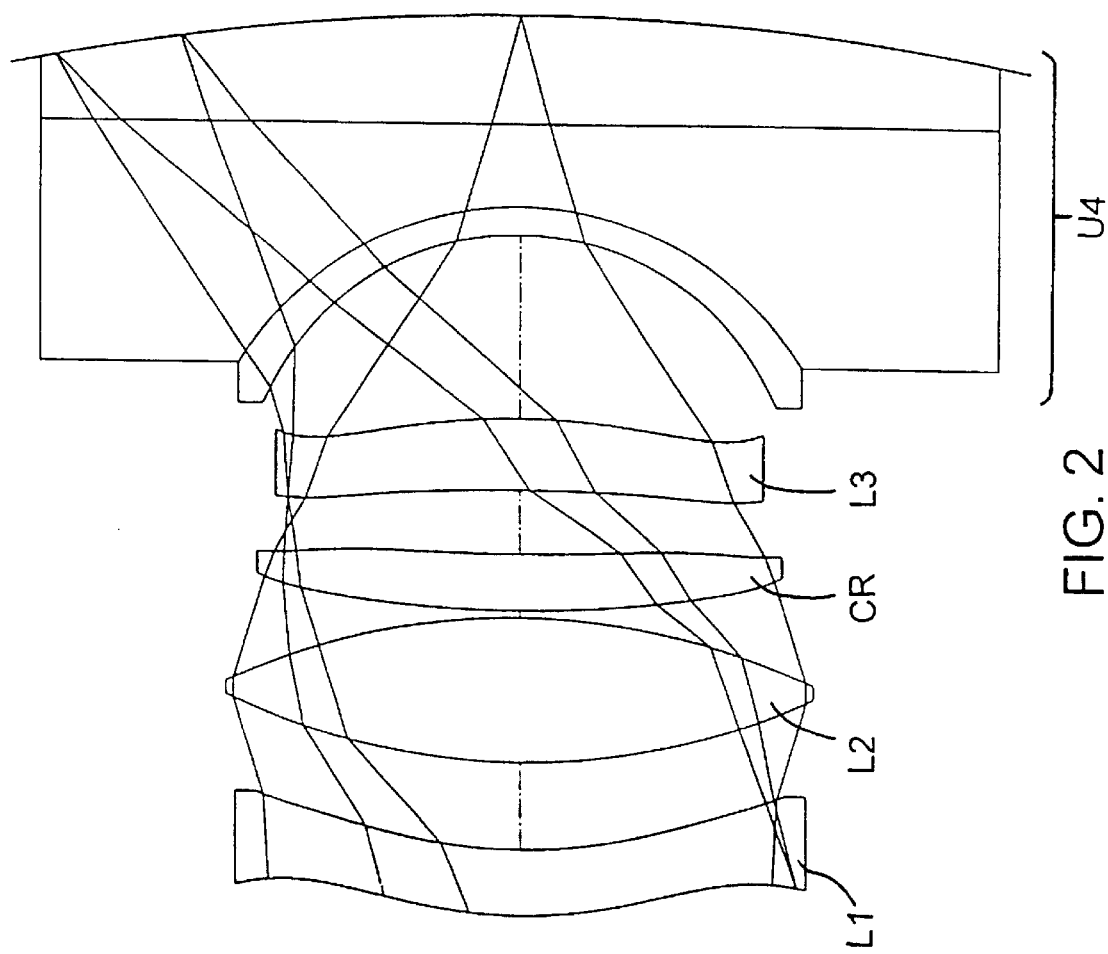
Figure 3:
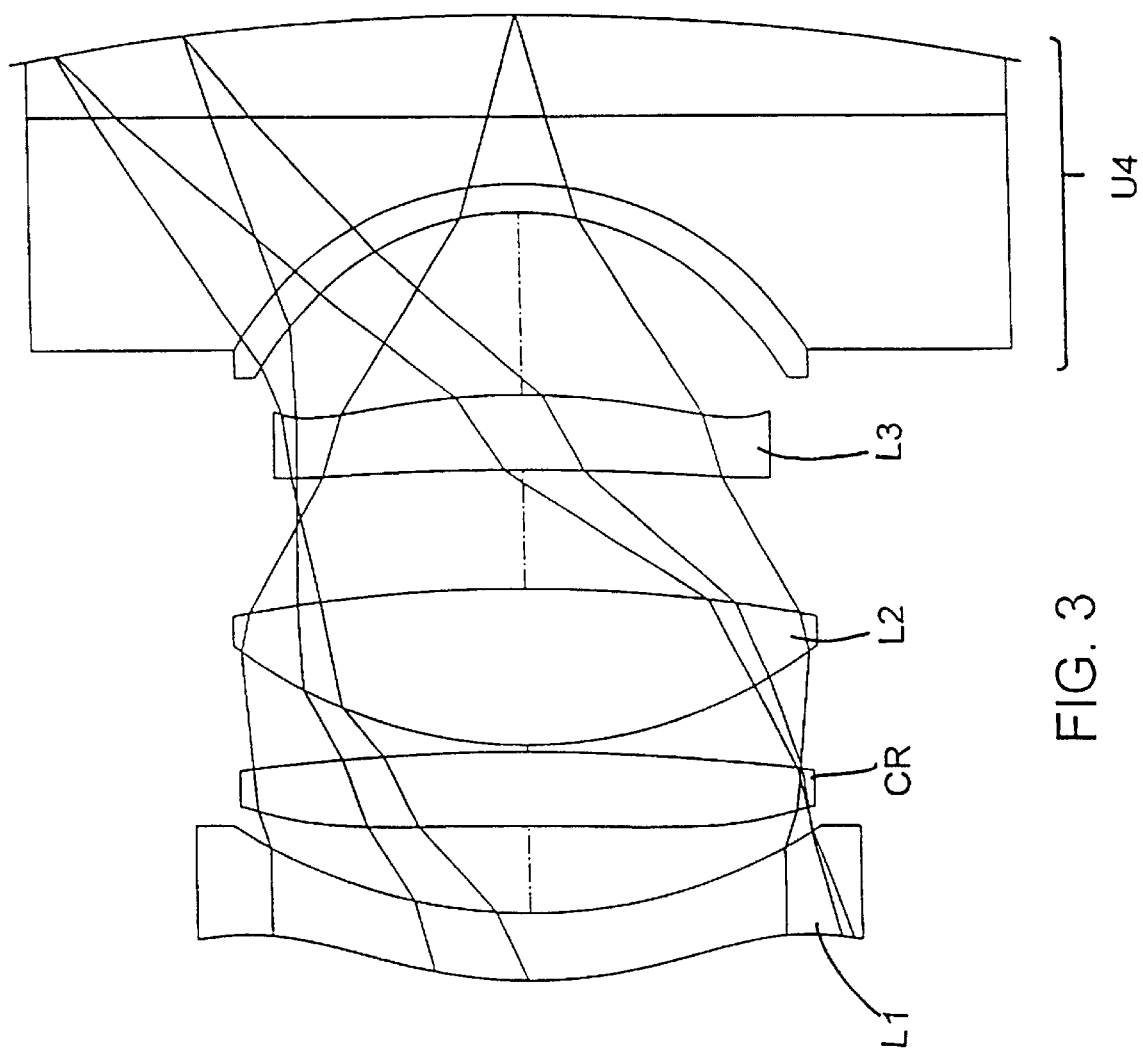
Figure 4:
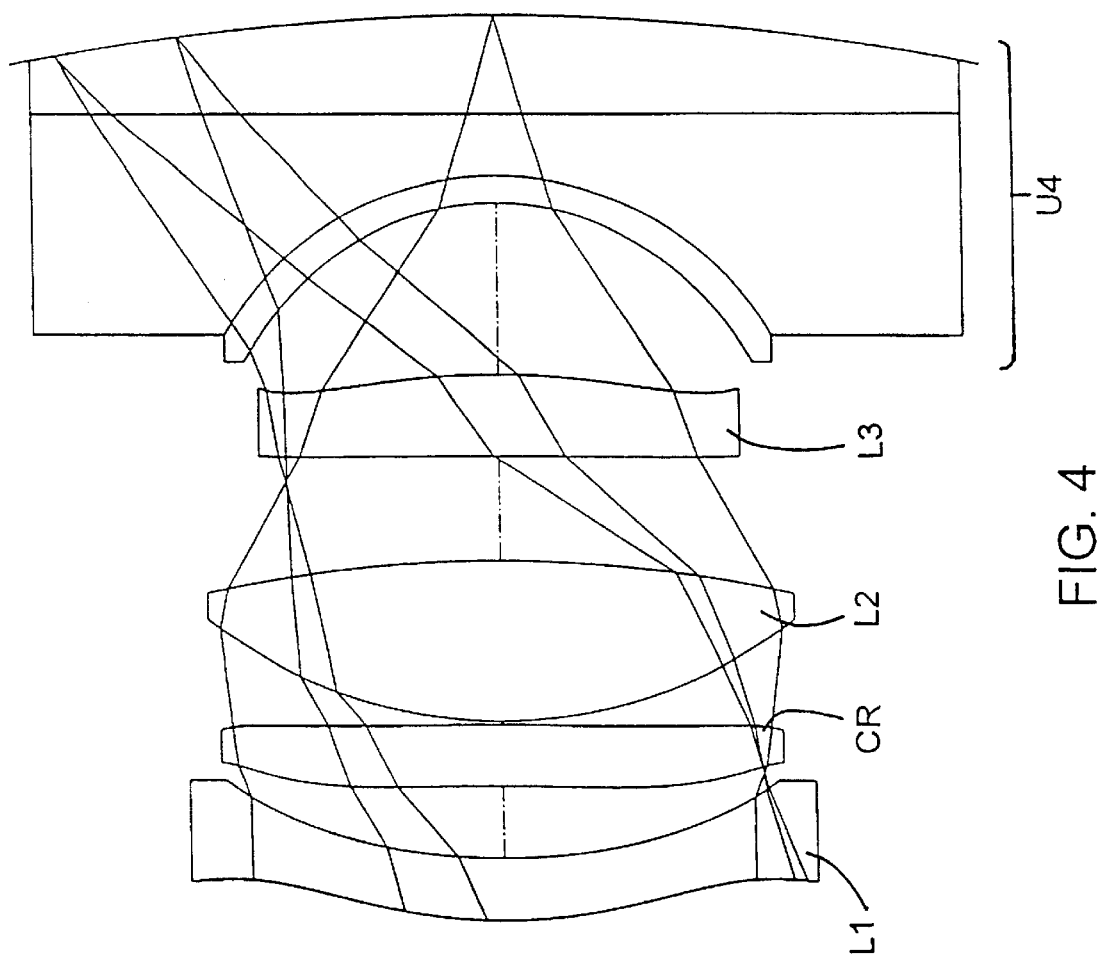
Figure 5:
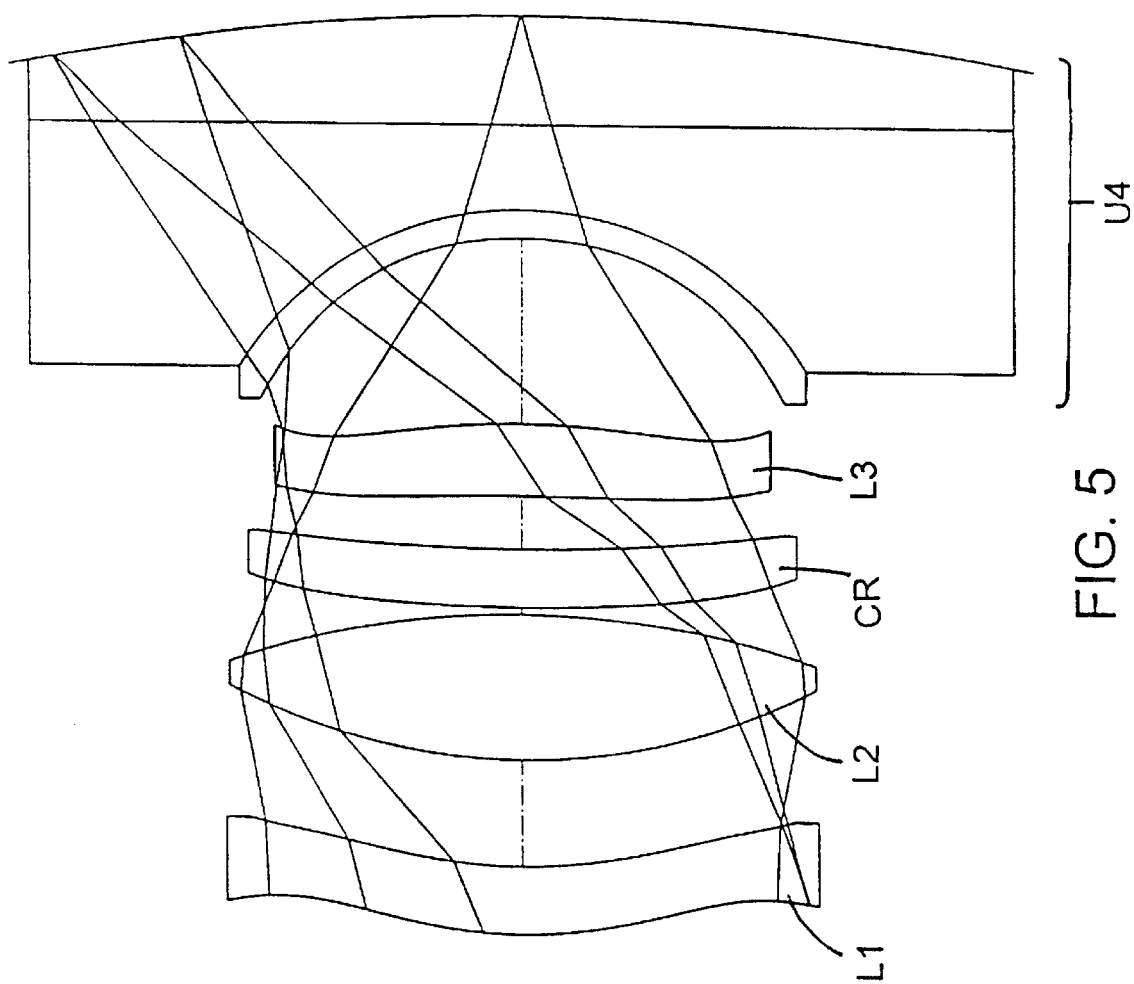
Figure 6:
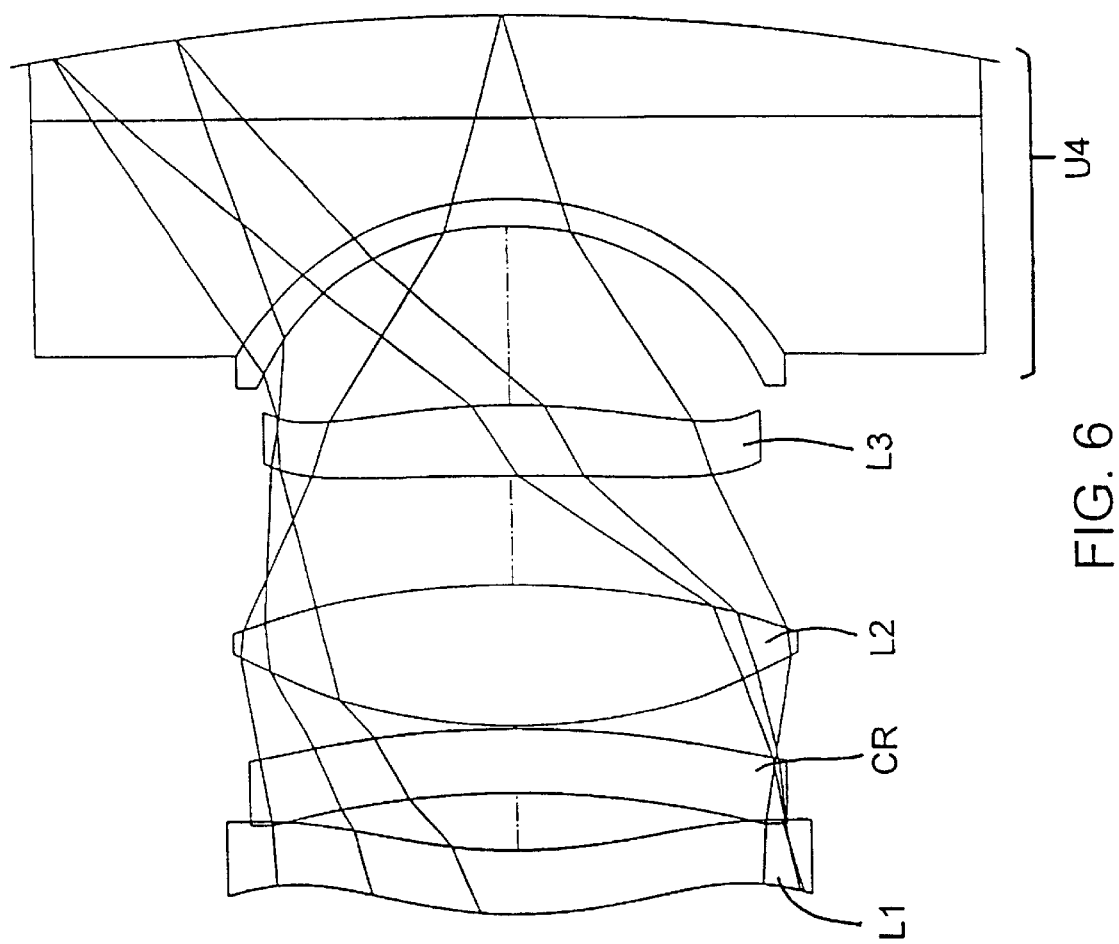

The foregoing drawings, which are incorporated in and constitute part of the specification, illustrate preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

As discussed above, the present invention relates to projection lens systems for use with projection televisions where the lens systems has five elements/units.

The first lens element, through its at least one aspherical surface, makes a major contribution to the correction of aperture dependent aberrations, i.e., spherical aberration and coma, as well as to the correction of residual amounts of distortion. The second lens element provides most of the positive optical power of the lens and is preferably composed of glass. The third lens element, through its at least one aspherical surface, provides correction for sagittal oblique spherical aberration.

The corrector lens element is located adjacent to the second lens element, i.e., the corrector lens element is either directly in front of or directly behind the second lens element with no other lens element between the corrector lens element and the second lens element. The corrector lens element provides correction for residual amounts of spherical and coma aberrations of the lens. Such correction is needed when both the field of view and the speed of the lens are increased in order to achieve a bright image and a compact projection TV set.

The aspherical elements, i.e., the first lens element, the third lens element, the corrector lens element, and optionally a lens element of the fourth unit, are preferably composed of a plastic material, e.g., acrylic, to meet the cost requirements for the lens.

The use of plastic lens elements has the drawback that the refractive index of plastic optical materials changes significantly with temperature. Another effect is the change in shape, i.e., expansion or contraction, of plastic optical materials with temperature. This latter effect is usually less significant than the change in index of refraction.

To address this problem and to also compensate for the thermal changes in the plastic or aluminum mechanical components of the system, e.g., the lens barrel which is usually the major mechanical source of thermally-caused focus changes, the third lens element needs to have a positive power and should also satisfy requirement (1) above.

More generally, athermalization of the projection lens systems of the invention is achieved by taking into account the location and power of the plastic lens elements, as well as the marginal ray heights at those elements.

The location of the plastic lens elements is significant in terms of the amount of temperature change the element will undergo and thus the amount of change which will occur in the element's index of refraction. In general, elements closer to the CRT undergo greater temperature changes. In practice, a temperature distribution in the region where the projection lens is to be located is measured with the CRT operating and those measured values are used in the design of the projection lens.

The marginal ray height at a particular plastic lens element determines, for a given thermal change, whether changes in the element's index of refraction will be significant with regard to the overall thermal stability of the lens. Elements for which the marginal ray height is small will in general have less effect on the overall thermal stability of the system than elements for which the marginal ray height is large.

Based on the foregoing considerations, athermalization of the projection lenses of the invention is achieved by (1) using only low powered plastic lens elements at locations where the marginal ray height is large and (2) using high powered plastic lens elements only at locations where the marginal ray height is small.

The level of athermalization achieved is preferably optimized using a computerized lens design program as follows. First, a ray trace is performed at a first temperature distribution and a performance parameter, e.g., image distance, is calculated. The ray trace can be a paraxial ray trace for the marginal ray. Second, the same ray trace is performed at a second temperature distribution and the performance parameter is again calculated. Neither the first nor the second temperature distribution need be constant over the entire lens but can, and in the typical case does, vary from lens element to lens element. The calculated values of the performance parameter are then constrained to a constant value as the design of the system is optimized using the lens design program.

It should be noted that the foregoing approach assumes that the mechanical mounts for the projection lens and the CRT hold the distance between the last lens surface and the CRT substantially constant as the temperature of the system changes. If such an assumption is not warranted, other provisions can be made for performing the athermalization, e.g., a measured value for the relative movement of the mechanical mounts can be included in the process or an alternate distance, e.g., the distance between the front lens surface and the CRT, can be assumed to be mechanically fixed.

FIGS. 1–6 illustrate various projection lenses constructed in accordance with the invention. Corresponding prescriptions appear in Tables 1–6. HOYA or SCHOTT designations are used for the glasses employed in the lens systems. Equivalent glasses made by other manufacturers can be used in the practice of the invention. Industry acceptable materials are used for the plastic elements.

The aspheric coefficients set forth in the tables are for use in the following equation:

$$z = \frac{cy^2}{1 + [1 - (1+k)c^2y^2]^{1/2}} + Dy^4 + Ey^6 + Fy^8 + Gy^{10} + Hy^{12} + Iy^{14}$$

where z is the surface sag at a distance y from the optical axis of the system, c is the curvature of the lens at the optical axis, and k is a conic constant, which is zero except where indicated in the prescriptions of Tables 1–6.

The designation "a" associated with various surfaces in the tables represents an aspheric surface, i.e., a surface for which at least one of D, E, F, G, H, or I in the above equation is not zero. The designation "c" represents a conic surface, i.e., a surface for which k in the above equation is not zero. All dimensions given in the tables are in millimeters. The tables are constructed on the assumption that light travels from left to right in the figures. In actual practice, the viewing screen will be on the left and the CRT will be on the right, and light will travel from right to left.

The CRT faceplate constitutes surfaces 11–12 in Table 1 and surfaces 12–13 in Tables 2–6. A coupling fluid is located between surfaces 10–11 in Table 1 and surfaces 11–12 in Tables 2–6. The material designations for these components are set forth as six digit numbers in the tables, where a $N_e$ value for the material is obtained by adding 1,000 to the first three digits of the designation, and a $V_e$ value is obtained from the last three digits by placing a decimal point before the last digit. Optional vignetting surfaces are shown at surface 3 in Tables 2 and 5, and surface 7 in Tables 3, 4, and 6.

Table 7 summarizes the focal lengths of the four lens elements and the negative lens unit (fourth lens unit) of the projection lens systems of Tables 1–6; Table 8 summarizes the $f_3/f_2$, $|f_c/f_3|$, and $t_c/t_2$ ratios for those lens systems; and Table 9 summarizes the maximum sag and clear aperture radii of the front and back surfaces of the corrector elements of those systems. As shown in Tables 8 and 9, the lens systems of the examples satisfy requirements (1) through (4) set forth above.

Figure 7:
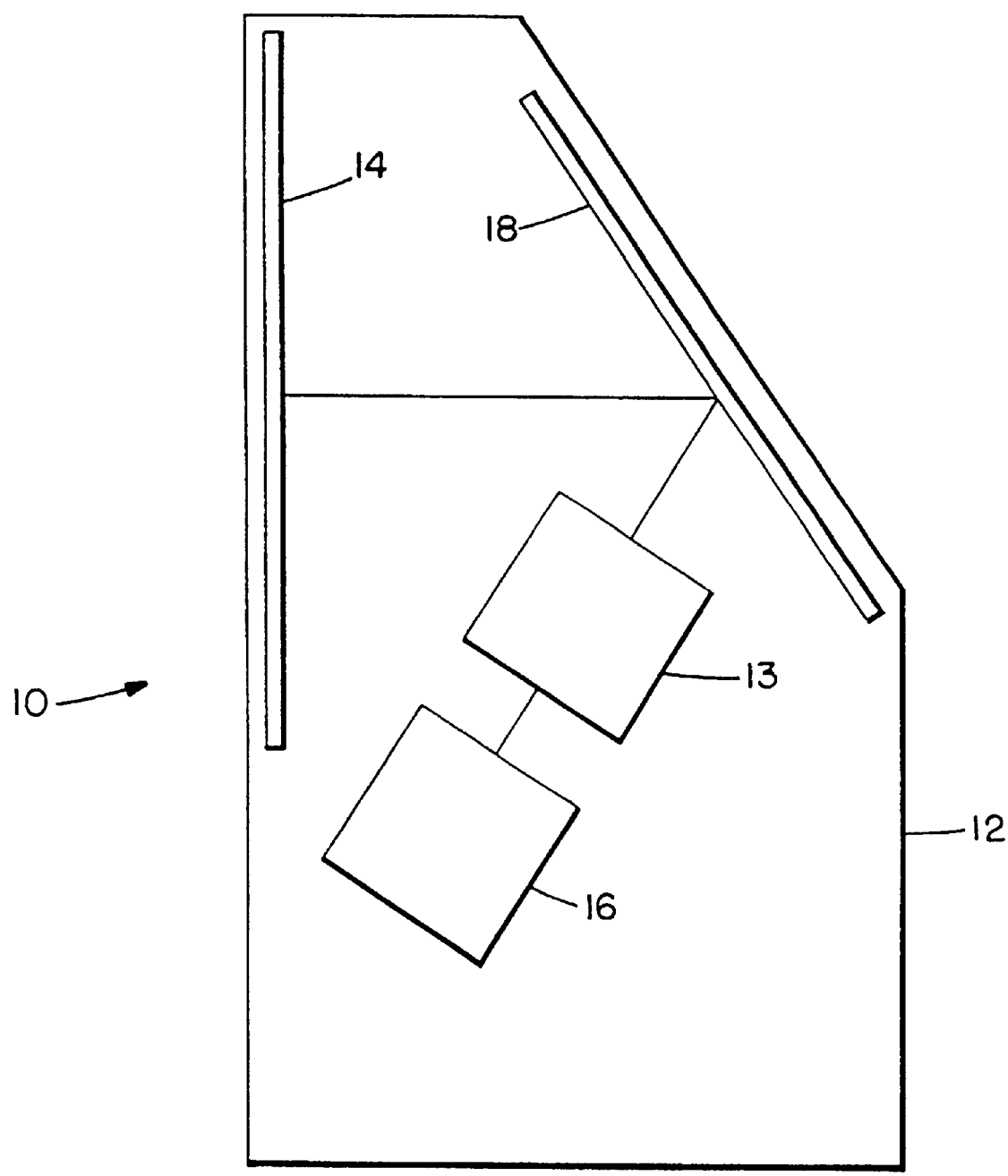
FIG. 7 is a schematic diagram of a rear projection TV employing a lens system constructed in accordance with the invention.

FIG. 7 is a schematic diagram of a CRT projection television 10 constructed in accordance with the invention. As shown in this figure, projection television 10 includes cabinet 12 having projection screen 14 along its front face and slanted mirror 18 along its back face. Module 13 schematically illustrates a lens system constructed in accordance with the invention and module 16 illustrates its associated CRT tube. In practice, three lens systems 13 and three CRT tubes 16 are used to project red, green, and blue images onto screen 14.

Although specific embodiments of the invention have been described and illustrated, it is to be understood that a variety of modifications which do not depart from the scope and spirit of the invention will be evident to persons of ordinary skill in the art from the foregoing disclosure.

TABLE 1

| Surf. No. | Type | Radius | Thickness | Glass | Clear Aperture Diameter |
|---|---|---|---|---|---|
| 1 | a | 64.6170 | 9.00000 | ACRYLIC | 76.63 |
| 2 | a | 74.6737 | 13.24561 |  | 70.62 |
| 3 |  | 102.6730 | 19.00000 | SK18 | 78.02 |
| 4 |  | −102.6730 | 2.49646 |  | 77.99 |
| 5 | a | 213.9182 | 9.00000 | ACRYLIC | 69.70 |
| 6 | a | 238.4175 | 8.79245 |  | 66.66 |
| 7 | a | −600.3131 | 8.00000 | ACRYLIC | 65.03 |
| 8 | a | −99.9159 | Space 1 |  | 65.92 |
| 9 | a | −43.6553 | 2.80000 | ACRYLIC | 70.35 |
| 10 |  | −42.8000 | 11.50000 | 437761 | 74.44 |
| 11 |  | ∞ | 14.10000 | 562979 | 117.82 |
| 12 |  | −350.0000 | Image distance |  | 127.51 |

Symbol Description
a - Polynomial asphere
Object and Image Surface
Surface Radius
Image  −350.0000

Even Polynomial Aspheres

| Surf. No. | D | E | F | G | H | I |
|---|---|---|---|---|---|---|
| 1 | −1.5145E−06 | −2.0811E−09 | −1.9064E−13 | 3.8499E−16 | 1.6854E−19 | −9.5812E−23 |
| 2 | 2.7224E−08 | −1.7048E−09 | −1.2566E−13 | 4.3077E−16 | 5.0326E−19 | −2.7442E−22 |
| 5 | −5.2359E−07 | 9.4403E−10 | −2.7339E−14 | −4.1308E−16 | −4.5350E−20 | 2.6990E−22 |
| 6 | −2.3663E−06 | −1.5930E−10 | −3.1503E−14 | −2.5184E−17 | 1.3552E−19 | 1.5470E−22 |
| 7 | −1.3635E−06 | −1.7295E−09 | 4.4646E−12 | −3.5118E−15 | 2.8120E−18 | −1.0821E−21 |

TABLE 1-continued

| | | | | | | |
|---|---|---|---|---|---|---|
| 8 | 3.2121E-08 | 3.1334E-09 | −5.4024E-12 | 9.7413E-15 | −6.2576E-18 | 1.4586E-21 |
| 9 | −5.3306E-06 | 1.3750E-08 | −2.9334E-11 | 3.4052E-14 | −2.0536E-17 | 4.8963E-21 |

Variable Spaces

| Pos. No. | Space 1 T(8) | Focal Shift | Image Distance |
|---|---|---|---|
| 1 | 26.612 | −0.347 | 0.000 |
| 2 | 25.831 | −0.064 | 0.000 |
| 3 | 27.000 | −0.550 | −0.025 |

First-Order Data

| | | | |
|---|---|---|---|
| f/number | 1.20 | 1.19 | 1.21 |
| Magnification | −0.1074 | −0.0895 | −0.1167 |
| Object Height | −635.00 | −762.00 | −584.20 |
| Object Distance | −770.45 | −915.50 | −712.18 |
| Effective Focal Length | 74.677 | 75.211 | 74.415 |
| Image Distance | 0.00 | 0.00 | −.25179E-01 |
| Overall Length | 895.00 | 1039.3 | 837.09 |
| Forward Vertex Distance | 124.55 | 123.77 | 124.91 |
| Barrel Length | 124.55 | 123.77 | 124.93 |
| Stop Surface Number | 3 | 3 | 3 |
| Distance to Stop | 7.32 | 7.32 | 7.32 |
| Stop Diameter | 78.027 | 77.316 | 77.925 |
| Entrance Pupil Distance | 26.413 | 26.413 | 26.413 |
| Exit Pupil Distance | −62.726 | −62.356 | −62.908 |

First Order Properties of Elements

| Element Number | Surface Numbers | | Power | f' | Ipp | I'pp |
|---|---|---|---|---|---|---|
| 1 | 1 | 2 | 0.13336E-02 | 749.87 | −29.875 | −34.524 |
| 2 | 3 | 4 | 0.12040E-01 | 83.055 | 6.0053 | −6.0053 |
| 3 | 5 | 6 | 0.26599E-03 | 3759.5 | −46.911 | −52.284 |
| 4 | 7 | 8 | 0.41412E-02 | 241.48 | 6.3911 | 1.0637 |
| 5 | 9 | 10 | 0.47062E-03 | 2124.9 | 45.951 | 45.050 |
| 6 | 10 | 11 | −0.10211E-01 | −97.932 | 0.15867E-07 | −8.0026 |
| 7 | 11 | 12 | 0.16066E-02 | 622.42 | 9.0250 | −0.28426E-07 |

First-Order Properties of Strong Negative Unit (U4)

| Element Numbers | Surface Numbers | Power | f' | Ipp | I'pp |
|---|---|---|---|---|---|
| 5 7 | 9 12 | −0.80439E-02 | −124.32 | −4.0758 | −23.713 |

First Order Properties of the Lens

| Position Number | Power | f' | Ipp | I'pp |
|---|---|---|---|---|
| 1 | 0.13391E-01 | 74.677 | −0.20098 | −82.347 |
| 2 | 0.13296E-01 | 75.211 | 0.48673E-01 | −81.878 |
| 3 | 0.13438E-01 | 74.415 | −0.32362 | −82.577 |

TABLE 2

| Surf. No. | Type | Radius | Thickness | Glass | Clear Aperture Diameter |
|---|---|---|---|---|---|
| 1 | a | 64.1696 | 9.00000 | ACRYLIC | 76.38 |
| 2 | a | 72.5288 | 6.88760 | | 70.87 |
| 3 | | ∞ | 5.00000 | | 70.86 |
| 4 | | 95.9080 | 20.00000 | SK5 | 78.69 |
| 5 | | −93.9611 | 1.00000 | | 78.70 |
| 6 | a | 161.3763 | 8.00000 | ACRYLIC | 70.23 |
| 7 | a | 243.5344 | 8.96862 | | 67.77 |
| 8 | a | −328.7054 | 10.00000 | ACRYLIC | 64.56 |
| 9 | a | −96.1051 | Space 1 | | 65.19 |
| 10 | a | −44.4443 | 4.00000 | ACRYLIC | 68.78 |
| 11 | | −45.0000 | 11.50000 | 447500 | 75.49 |
| 12 | | ∞ | 14.60000 | 563500 | 117.08 |
| 13 | | −350.0000 | Image distance | | 127.39 |

TABLE 2-continued

Symbol Description
a - Polynomial asphere
Object and Image Surface
Surface   Radius
Image     −350.0000

Even Polynomial Aspheres

| Surf. No. | D | E | F | G | H | I |
|---|---|---|---|---|---|---|
| 1 | −1.7768E-06 | −2.2790E-09 | −1.2882E-13 | 3.9166E-16 | 1.9154E-19 | −1.0825E-22 |
| 2 | −2.1886E-07 | −1.8196E-09 | −1.7840E-13 | 5.4008E-16 | 5.4710E-19 | −3.2177E-22 |
| 6 | −5.7432E-07 | 9.1416E-10 | −1.6130E-13 | −3.9323E-16 | 7.6204E-21 | 2.6195E-22 |
| 7 | −2.1947E-06 | −1.8760E-10 | 7.8822E-15 | 7.4217E-17 | 9.8122E-20 | 1.2726E-22 |
| 8 | −1.1227E-06 | −1.1754E-09 | 4.2781E-12 | −3.7085E-15 | 2.8301E-18 | −1.0176E-21 |
| 9 | −9.9779E-09 | 3.5422E-09 | −5.7292E-12 | 9.4726E-15 | −6.1926E-18 | 1.5989E-21 |
| 10 | −6.3885E-06 | 1.4301E-08 | −3.0081E-11 | 3.4507E-14 | −2.0734E-17 | 4.8859E-21 |

Variable Spaces

| Pos. No. | Space 1 T(9) | Focal Shift | Image Distance |
|---|---|---|---|
| 1 | 25.434 | −0.335 | 0.000 |
| 2 | 24.706 | −0.001 | 0.000 |

First-Order Data

| | | |
|---|---|---|
| f/number | 1.20 | 1.19 |
| Magnification | −0.1074 | −0.0895 |
| Object Height | −635.00 | −762.00 |
| Object Distance | −770.61 | −915.36 |
| Effective Focal Length | 74.687 | 75.193 |
| Image Distance | 0.00 | 0.00 |
| Overall Length | 895.00 | 1039.0 |
| Forward Vertex Distance | 124.39 | 123.66 |
| Barrel Length | 124.39 | 123.66 |
| Stop Surface Number | 4 | 4 |
| Distance to Stop | 8.17 | 8.17 |
| Stop Diameter | 78.687 | 77.934 |
| Entrance Pupil Distance | 25.640 | 25.640 |
| Exit Pupil Distance | −63.139 | −62.790 |

First Order Properties of Elements

| Element Number | Surface Numbers | | Power | f' | Ipp | I'pp |
|---|---|---|---|---|---|---|
| 1 | 1 | 2 | 0.12025E-02 | 831.61 | −34.111 | −38.555 |
| 2 | 4 | 5 | 0.11973E-01 | 83.521 | 6.6067 | −6.4726 |
| 3 | 6 | 7 | 0.10655E-02 | 938.56 | −10.191 | −15.380 |
| 4 | 8 | 9 | 0.36874E-02 | 271.20 | 9.3279 | 2.7272 |
| 5 | 10 | 11 | 0.18925E-03 | 5284.1 | 155.26 | 157.20 |
| 6 | 11 | 12 | −0.99422E-02 | −100.58 | 0.42949E-07 | −7.9453 |
| 7 | 12 | 13 | 0.16086E-02 | 621.67 | 9.3410 | 0.67400E-06 |

First-Order Properties of Strong Negative Unit (U4)

| Element Numbers | Surface Numbers | Power | f' | Ipp | I'pp |
|---|---|---|---|---|---|
| 5 7 | 10 13 | −0.81129E-02 | −123.26 | −4.2890 | −25.078 |

First Order Properties of the Lens

| Position Number | Power | f' | Ipp | I'pp |
|---|---|---|---|---|
| 1 | 0.13389E-01 | 74.687 | −0.25876 | −82.369 |
| 2 | 0.13299E-01 | 75.193 | −0.21077E-01 | −81.922 |

TABLE 3

| Surf. No. | Type | Radius | Thickness | Glass | Clear Aperture Diameter |
|---|---|---|---|---|---|
| 1 | a | 69.2450 | 9.00000 | ACRYLIC | 88.90 |
| 2 | c | 75.2381 | 12.14395 | | 78.40 |
| 3 | a | −464.1651 | 10.00000 | ACRYLIC | 77.80 |
| 4 | a | −253.4752 | 1.00000 | | 76.72 |
| 5 | | 63.6187 | 22.00000 | SK5 | 77.89 |
| 6 | | −203.9104 | 11.33472 | | 75.56 |
| 7 | | ∞ | 5.40000 | | 62.85 |
| 8 | a | −534.2289 | 10.00000 | ACRYLIC | 63.57 |
| 9 | a | −99.9266 | Space 1 | | 65.99 |
| 10 | a | −40.0420 | 4.90000 | ACRYLIC | 71.10 |
| 11 | | −45.0000 | 9.00000 | 432670 | 76.50 |
| 12 | | ∞ | 14.10000 | 562722 | 130.00 |
| 13 | | −350.0000 | Image distance | | 130.00 |

Symbol Description
a - Polynomial asphere
c - Conic section
Object and Image Surface
Surface   Radius
Image   −350.0000
Conics
Surface
Number   Constant
2   4.1383E−01

Even Polynomial Aspheres

| Surf. No. | D | E | F | G | H | I |
|---|---|---|---|---|---|---|
| 1 | −1.3429E−06 | −6.4068E−09 | −4.1106E−13 | 7.8921E−17 | 1.3050E−19 | −3.6454E−23 |
| 3 | 1.1907E−06 | 9.3962E−10 | −3.4688E−13 | 2.0027E−17 | 8.3473E−20 | −5.7693E−23 |
| 4 | 3.0126E−07 | 2.9676E−10 | −3.6864E−13 | 5.5455E−18 | 2.1647E−19 | −9.3742E−23 |
| 8 | −3.7448E−07 | −1.9920E−09 | 5.1640E−12 | −5.3193E−15 | 3.4478E−18 | −1.0395E−21 |
| 9 | 2.1319E−07 | 2.7527E−09 | −5.2754E−12 | 8.8287E−15 | −5.9966E−18 | 1.7092E−21 |
| 10 | −4.5889E−06 | 1.6253E−08 | −3.1557E−11 | 3.6166E−14 | −2.2102E−17 | 5.6074E−21 |

Variable Spaces

| Pos. No. | Space 1 T(9) | Focal Shift | Image Distance |
|---|---|---|---|
| 1 | 25.213 | −0.849 | 0.000 |
| 2 | 24.544 | −0.582 | 0.000 |

First-Order Data

| | | |
|---|---|---|
| f/number | 1.22 | 1.21 |
| Magnification | −0.1167 | −0.1013 |
| Object Height | −584.20 | −673.10 |
| Object Distance | −730.73 | −835.72 |
| Effective Focal Length | 76.401 | 76.923 |
| Image Distance | 0.19640E−03 | 0.00 |
| Overall Length | 863.92 | 968.24 |
| Forward Vertex Distance | 133.19 | 132.52 |
| Barrel Length | 133.19 | 132.52 |
| Stop Surface Number | 5 | 5 |
| Distance to Stop | 14.04 | 14.04 |
| Stop Diameter | 77.465 | 77.557 |
| Entrance Pupil Distance | 39.203 | 39.203 |
| Exit Pupil Distance | −58.714 | −58.410 |

First Order Properties of Elements

| Element Number | Surface Numbers | | Power | f' | Ipp | I'pp |
|---|---|---|---|---|---|---|
| 1 | 1 | 2 | 0.84998E−02 | 1176.5 | −46.520 | −50.547 |
| 2 | 3 | 4 | 0.89810E−03 | 1113.5 | 14.521 | 7.9295 |
| 3 | 5 | 6 | 0.11824E−01 | 84.574 | 3.3910 | −10.869 |
| 4 | 8 | 9 | 0.40477E−02 | 247.05 | 8.1725 | 1.5287 |
| 5 | 10 | 11 | −0.99632E−03 | −1003.7 | −29.491 | −33.143 |
| 6 | 11 | 12 | −0.96000E−02 | −104.17 | −0.25370E−07 | −6.2849 |
| 7 | 12 | 13 | 0.16057E−02 | 622.78 | 9.0269 | 0.21127E−06 |

TABLE 3-continued

First-Order Properties of Strong Negative Unit (U4)

| Element Numbers | Surface Numbers | Power | f' | Ipp | I'pp |
|---|---|---|---|---|---|
| 5 7 | 10 13 | −0.89863E-02 | −111.28 | −3.6135 | −22.270 |

First Order Properties of the Lens

| Position Number | Power | f' | Ipp | I'pp |
|---|---|---|---|---|
| 1 | 0.13089E-01 | 76.401 | 0.35311 | −84.468 |
| 2 | 0.13000E-01 | 76.923 | 0.55715 | −84.133 |

TABLE 4

| Surf. No. | Type | Radius | Thickness | Glass | Clear Aperture Diameter |
|---|---|---|---|---|---|
| 1 | a | 72.3377 | 9.00000 | ACRYLIC | 88.61 |
| 2 | c | 91.1140 | 10.41842 | | 78.00 |
| 3 | a | −406.6947 | 9.00000 | ACRYLIC | 77.71 |
| 4 | a | −618.5699 | 0.55188 | | 79.28 |
| 5 | | 69.7589 | 23.00000 | SK18 | 82.92 |
| 6 | | −188.9344 | 9.58138 | | 80.88 |
| 7 | | ∞ | 5.79474 | | 65.06 |
| 8 | a | −3588.2802 | 12.00000 | ACRYLIC | 64.44 |
| 9 | a | −111.8675 | Space 1 | | 67.64 |
| 10 | a | −40.0420 | 4.00000 | ACRYLIC | 71.73 |
| 11 | | −45.0000 | 9.00000 | 432500 | 77.10 |
| 12 | | ∞ | 14.10000 | 562500 | 130.00 |
| 13 | | −350.0000 | Image distance | | 130.00 |

Symbol Description
a - Polynomial asphere
c - Conic section
Object and Image Surface
Surface   Radius
Image     −350.0000
Conics
Surface
Number    Constant
2         2.5350E+00

Even Polynomial Aspheres

| Surf. No. | D | E | F | G | H | I |
|---|---|---|---|---|---|---|
| 1 | −1.1988E-06 | −5.8460E-10 | −4.2792E-13 | 8.3067E-17 | 1.4019E-19 | −4.0002E-23 |
| 3 | 2.0254E-06 | 5.0741E-10 | −1.9433E-13 | 2.6647E-17 | 5.0827E-20 | −6.2367E-23 |
| 4 | 1.2451E-06 | −4.8854E-10 | −1.5756E-13 | 1.0043E-16 | 1.0073E-19 | −7.8790E-23 |
| 8 | 4.8154E-08 | −1.5852E-09 | 4.3827E-12 | −4.4697E-15 | 2.0920E-18 | −4.0078E-22 |
| 9 | 2.0855E-07 | 3.9434E-09 | −7.0469E-12 | 8.8524E-15 | −5.3220E-18 | 1.3500E-21 |
| 10 | −4.5889E-06 | 1.6253E-08 | −3.1557E-11 | 3.6166E-14 | −2.2102E-17 | 5.6074E-21 |

Variable Spaces

| Pos. No. | Space 1 T(9) | Focal Shift | Image Distance |
|---|---|---|---|
| 1 | 25.191 | −0.467 | 0.000 |
| 2 | 24.361 | −0.214 | 0.000 |

First-Order Data

| | | |
|---|---|---|
| f/number | 1.18 | 1.15 |
| Magnification | −0.1078 | −0.0898 |
| Object Height | −635.00 | −762.00 |
| Object Distance | −790.87 | −941.19 |
| Effective Focal Length | 76.723 | 77.375 |
| Image Distance | −.21628E-03 | 0.00 |
| Overall Length | 922.51 | 1072.0 |
| Forward Vertex Distance | 131.64 | 130.81 |
| Barrel Length | 131.64 | 130.81 |
| Stop Surface Number | 4 | 4 |

TABLE 4-continued

| | | |
|---|---|---|
| Distance to Stop | 9.53 | 9.53 |
| Stop Diameter | 80.312 | 81.759 |
| Entrance Pupil Distance | 35.572 | 35.572 |
| Exit Pupil Distance | −59.113 | −58.739 |

First Order Properties of Elements

| Element Number | Surface Numbers | | Power | f' | Ipp | I'pp |
|---|---|---|---|---|---|---|
| 1 | 1 | 2 | 0.16295E-02 | 613.67 | −20.037 | −25.238 |
| 2 | 3 | 4 | −0.41003E-03 | −2438.9 | −11.730 | −17.840 |
| 3 | 5 | 6 | 0.12150E-01 | 82.306 | 3.9148 | −10.603 |
| 4 | 8 | 9 | 0.42812E-02 | 233.58 | 8.2824 | 0.25821 |
| 5 | 10 | 11 | −0.99632E-03 | −1003.7 | −29.491 | −33.143 |
| 6 | 11 | 12 | −0.96000E-02 | −104.17 | −0.25370E-07 | −6.2849 |
| 7 | 12 | 13 | 0.16057E-02 | 622.78 | 9.0269 | 0.21127E-06 |

First-Order Properties of Strong Negative Unit (U4)

| Element Numbers | Surface Numbers | Power | f' | Ipp | I'pp |
|---|---|---|---|---|---|
| 5 7 | 10 13 | −0.89869E-02 | −111.28 | −3.6135 | −22.270 |

First Order Properties of the Lens

| Position Number | Power | f' | Ipp | I'pp |
|---|---|---|---|---|
| 1 | 0.13034E-01 | 76.723 | −2.4291 | −84.527 |
| 2 | 0.12924E-01 | 77.375 | −2.1749 | −84.110 |

TABLE 5

| Surf. No. | Type | Radius | Thickness | Glass | Clear Aperture Diameter |
|---|---|---|---|---|---|
| 1 | a | 63.4053 | 9.00000 | ACRYLIC | 78.80 |
| 2 | a | 75.4496 | 9.25786 | | 72.42 |
| 3 | | ∞ | 5.00000 | | 71.60 |
| 4 | | 85.5724 | 20.00000 | SK18 | 78.01 |
| 5 | | −121.4048 | 1.00000 | | 78.02 |
| 6 | a | 255.2564 | 8.00000 | ACRYLIC | 72.81 |
| 7 | | 283.5134 | 7.35659 | | 69.44 |
| 8 | a | −487.8761 | 10.00000 | ACRYLIC | 67.21 |
| 9 | a | −106.1456 | Space 1 | | 65.68 |
| 10 | a | −47.6447 | 4.00000 | ACRYLIC | 69.57 |
| 11 | | −45.0000 | 11.50000 | 447500 | 75.33 |
| 12 | | ∞ | 14.60000 | 563500 | 130.00 |
| 13 | | −350.0900 | Image distance | | 130.00 |

Symbol Description
a - Polynomial asphere
Object and Image Surface
Surface   Radius
Image    −350.0000

Even Polynomial Aspheres

| Surf. No. | D | E | F | G | H | I |
|---|---|---|---|---|---|---|
| 1 | −1.8613E-06 | −1.8989E-09 | −2.9314E-13 | 3.1437E-16 | 2.4888E-19 | −1.1204E-22 |
| 2 | −6.8547E-07 | −1.7975E-09 | −3.5006E-14 | 3.6142E-16 | 3.8632E-19 | −1.9462E-22 |
| 6 | 3.3404E-07 | 2.3931E-10 | −6.2079E-15 | 1.5823E-17 | 3.2768E-20 | −4.1761E-24 |
| 8 | 7.1871E-07 | −4.6576E-11 | 3.6037E-12 | −4.3464E-15 | 2.5061E-18 | −7.0410E-22 |
| 9 | 1.1535E-06 | 3.1888E-09 | −4.8449E-12 | 8.7456E-15 | −6.8576E-18 | 2.0314E-21 |
| 10 | −5.7576E-96 | 1.2679E-08 | −2.9154E-11 | 3.5194E-14 | −2.1932E-17 | 5.3846E-21 |

Variable Spaces

| Pos. No. | Space 1 T(9) | Focal Shift | Image Distance |
|---|---|---|---|
| 1 | 25.667 | −0.388 | 0.000 |
| 2 | 24.938 | −0.032 | 0.001 |

TABLE 5-continued

First-Order Data

| | | |
|---|---|---|
| f/number | 1.20 | 1.19 |
| Magnification | −0.1074 | −0.0895 |
| Object Height | −635.00 | −762.00 |
| Object Distance | −769.62 | −914.09 |
| Effective Focal Length | 74.845 | 75.304 |
| Image Distance | 0.35122E-03 | 0.50988E-03 |
| Overall Length | 895.00 | 1038.7 |
| Forward Vertex Distance | 125.38 | 124.65 |
| Barrel Length | 125.38 | 124.65 |
| Stop Surface Number | 4 | 4 |
| Distance to Stop | 7.30 | 7.30 |
| Stop Diameter | 77.297 | 76.516 |
| Entrance Pupil Distance | 27.739 | 27.739 |
| Exit Pupil Distance | −63.543 | −63.166 |

First Order Properties of Elements

| Element Number | Surface Numbers | | Power | f' | Ipp | I'pp |
|---|---|---|---|---|---|---|
| 1 | 1 | 2 | 0.15502E-02 | 645.06 | −25.435 | −30.267 |
| 2 | 4 | 5 | 0.12294E-01 | 81.341 | 5.2357 | −7.4280 |
| 3 | 6 | 7 | 0.21084E-03 | 4742.9 | −44.239 | −49.136 |
| 4 | 8 | 9 | 0.36713E-02 | 272.38 | 8.4825 | 1.8455 |
| 5 | 10 | 11 | 0.91360E-03 | 1094.6 | 32.161 | 30.376 |
| 6 | 11 | 12 | −0.99422E-02 | −100.58 | 0.42949E-07 | −7.9453 |
| 7 | 12 | 13 | 0.16086E-02 | 621.67 | 9.3410 | 0.67400E-06 |

First-Order Properties of Strong Negative Unit (U4)

| Element Numbers | | Surface Numbers | | Power | f' | Ipp | I'pp |
|---|---|---|---|---|---|---|---|
| 5 | 7 | 10 | 13 | −0.73926E-02 | −135.27 | −4.7069 | −25.511 |

First Order Properties of the Lens

| Position Number | Power | f' | Ipp | I'pp |
|---|---|---|---|---|
| 1 | 0.13361E-01 | 74.845 | 2.3672 | −82.492 |
| 2 | 0.13279E-01 | 75.304 | 2.6019 | −82.012 |

TABLE 6

| Surf. No. | Type | Radius | Thickness | Glass | Clear Aperture Diameter |
|---|---|---|---|---|---|
| 1 | a | 66.0801 | 9.00000 | ACRYLIC | 80.87 |
| 2 | a | 83.3993 | 8.14818 | | 68.00 |
| 3 | | −136.9181 | 9.00000 | ACRYLIC | 68.00 |
| 4 | a | −158.8080 | 0.50000 | | 74.27 |
| 5 | | 82.2227 | 20.00000 | SK18 | 78.05 |
| 6 | | −123.0197 | 15.47255 | | 77.40 |
| 7 | | ∞ | 0.10000 | | 68.71 |
| 8 | a | −481.6406 | 10.00000 | ACRYLIC | 68.54 |
| 9 | a | −106.7392 | Space 1 | | 66.73 |
| 10 | a | −48.7618 | 4.00000 | ACRYLIC | 70.21 |
| 11 | | −45.0000 | 11.50000 | 447500 | 75.84 |
| 12 | | ∞ | 14.60000 | 563500 | 130.00 |
| 13 | | −350.0000 | Image distance | | 130.00 |

Symbol Description
a - Polynomial asphere
Object and Image Surface
Surface   Radius
Image     −350.0000

Even Polynomial Aspheres

| Surf. No. | D | E | F | G | H | I |
|---|---|---|---|---|---|---|
| 1 | −1.9013E-06 | −1.9154E-09 | −3.1595E-13 | 3.0950E-16 | 2.5210E-19 | −1.0997E-22 |
| 2 | −8.7994E-07 | −1.8549E-09 | −4.8964E-14 | 3.4400E-16 | 3.7063E-19 | −2.0328E-22 |

TABLE 6-continued

| | | | | | | |
|---|---|---|---|---|---|---|
| 4 | −2.7435E−08 | 4.3221E−11 | 1.1169E−14 | −8.4000E−18 | 1.8572E−22 | 1.4409E−23 |
| 8 | 3.5888E−07 | −1.0615E−10 | 3.6373E−12 | −4.2898E−15 | 2.5944E−18 | −5.8481E−22 |
| 9 | 5.0120E−07 | 3.0579E−09 | −4.8933E−12 | 8.6057E−15 | −6.9121E−18 | 2.2734E−21 |
| 10 | −5.9421E−06 | 1.2691E−08 | −2.9059E−11 | 3.5316E−14 | −2.1902E−17 | 5.2194E−21 |

Variable Spaces

| Pos. No. | Space 1 T(9) | Focal Shift | Image Distance |
|---|---|---|---|
| 1 | 25.585 | −0.388 | 0.001 |
| 2 | 24.870 | −0.007 | 0.001 |

First-Order Data

| | | |
|---|---|---|
| f/number | 1.20 | 1.19 |
| Magnification | −0.1074 | −0.0895 |
| Object Height | −635.00 | −762.00 |
| Object Distance | −767.10 | −911.38 |
| Effective Focal Length | 74.891 | 75.327 |
| Image Distance | 0.66015E−03 | 0.58743E−03 |
| Overall Length | 895.01 | 1038.6 |
| Forward Vertex Distance | 127.91 | 127.19 |
| Barrel Length | 127.91 | 127.19 |
| Stop Surface Number | 5 | 5 |
| Distance to Stop | 9.04 | 9.04 |
| Stop Diameter | 78.234 | 77.480 |
| Entrance Pupil Distance | 29.133 | 29.133 |
| Exit Pupil Distance | −64.497 | −64.122 |

First Order Properties of Elements

| Element Number | Surface Numbers | | Power | f' | Ipp | I'pp |
|---|---|---|---|---|---|---|
| 1 | 1 | 2 | 0.18183E−02 | 549.96 | −19.618 | −24.760 |
| 2 | 3 | 4 | −0.42954E−03 | −2328.1 | −43.613 | −50.585 |
| 3 | 5 | 6 | 0.12517E−01 | 79.893 | 5.0749 | −7.5930 |
| 4 | 8 | 9 | 0.36326E−02 | 275.29 | 8.5253 | 1.8893 |
| 5 | 10 | 11 | 0.11441E−02 | 874.08 | 25.683 | 23.702 |
| 6 | 11 | 12 | −0.99422E−02 | −100.58 | 0.42949E−07 | −7.9453 |
| 7 | 12 | 13 | 0.16086E−02 | 621.67 | 9.3410 | 0.67400E−06 |

First-Order Properties of Strong Negative Unit (U4)

| Element Numbers | Surface Numbers | | Power | f' | Ipp | I'pp |
|---|---|---|---|---|---|---|
| 5 7 | 10 | 13 | −0.71634E−02 | −139.60 | −4.8575 | −25.667 |

First Order Properties of the Lens

| Position Number | Power | f' | Ipp | I'pp |
|---|---|---|---|---|
| 1 | 0.13353E−01 | 74.891 | 5.3584 | −82.543 |
| 2 | 0.13275E−01 | 75.327 | 5.5872 | −82.061 |

TABLE 7

| Ex. No. | $f_0$ | $f_1$ | $f_2$ | $f_3$ | $f_4$ | $f_c$ |
|---|---|---|---|---|---|---|
| 1 | 74.68 | 749.87 | 83.06 | 241.48 | −124.32 | 3759.54 |
| 2 | 74.69 | 831.61 | 83.52 | 271.20 | −123.26 | 938.56 |
| 3 | 76.40 | 1176.50 | 84.57 | 247.05 | −111.28 | 1113.46 |
| 4 | 76.72 | 613.67 | 82.31 | 233.58 | −111.28 | −2438.85 |
| 5 | 74.85 | 645.06 | 81.34 | 272.38 | −135.27 | 4742.93 |
| 6 | 74.89 | 549.96 | 79.89 | 275.29 | −139.60 | −2328.07 |

TABLE 8

| Ex. No. | $f_3/f_2$ | $|f_c/f_3|$ | $t_c/t_2$ |
|---|---|---|---|
| 1 | 2.91 | 15.57 | 0.13 |
| 2 | 3.25 | 3.46 | 0.05 |
| 3 | 2.92 | 4.51 | 0.05 |
| 4 | 2.84 | 10.44 | 0.02 |
| 5 | 3.35 | 17.41 | 0.05 |
| 6 | 3.45 | 8.46 | 0.03 |

TABLE 9

| Ex. No. | Surf. No. | max\|z\| | $r_{ca}$ | max\|z\|/$r_{ca}$ |
|---|---|---|---|---|
| 1 | 5 | 3.532 | 34.85 | 0.101 |
|   | 6 | 0.451 | 33.33 | 0.014 |
| 2 | 6 | 4.376 | 35.12 | 0.125 |
|   | 7 | 0.463 | 33.89 | 0.014 |
| 3 | 3 | 2.643 | 38.90 | 0.068 |
|   | 4 | 2.501 | 38.36 | 0.065 |
| 4 | 3 | 3.189 | 38.86 | 0.082 |
|   | 4 | 0.439 | 39.64 | 0.011 |
| 5 | 6 | 3.946 | 36.41 | 0.108 |
|   | 7 | 2.134 | 34.72 | 0.061 |
| 6 | 3 | 4.280 | 34.00 | 0.126 |
|   | 4 | 4.206 | 37.14 | 0.113 |

What is claimed is:

1. A projection lens system for use with a cathode ray tube (CRT) which in combination with the CRT has a focal length $f_0$ and which from its long conjugate to its short conjugate consists of:

(a) a first lens element which has (i) a weak optical power and (ii) at least one aspherical surface;

(b) a second lens element which (i) has a positive focal length $f_2$ and (ii) provides most of the optical power of the lens system, the ratio of $f_0$ to $f_2$ being at least about 0.89;

(c) a third lens element which has (i) a positive focal length $f_3$ and (ii) at least one aspherical surface; and (d) a fourth lens unit which, during use of the lens system, (i) consists of a lens element, coupling fluid, and the faceplate of the CRT, (ii) has a strong negative optical power, and (ii) provides most of the correction of the field curvature of the lens system;

and which further consists of:

(e) a corrector lens element which is located adjacent to the second lens element and has (i) a weak optical power and (ii) at least one aspherical surface;

wherein:

$2 < f_3/f_2 < 4$, $|f_c/f_3| > 3$, and max\|z\|/$r_{ca}$ < 0.15 where $f_c$ is the focal length of the corrector lens element, max\|z\| is the maximum sag of the two surfaces of the corrector lens element, and $r_{ca}$ is the clear aperture radius of the surface having the maximum sag.

2. The projection lens system of claim 1 wherein the lens system satisfies the relationship $t_c/t_2 < 0.35$, where $t_c$ is the distance between the corrector lens element and the second lens element and $t_2$ is the thickness of the second lens element.

3. The projection lens system of claim 1 wherein the lens system has a half angle field of view in the direction of its long conjugate of at least 33 degrees.

4. The projection lens system of claim 1 wherein the f-number of the lens system for a long conjugate of infinite length is less than 1.2.

5. A projection television set comprising a cathode ray tube, a screen, and a projection lens system for projecting light from the cathode ray tube onto the screen to form an image, said projection lens system comprising the projection lens system of claim 1.

6. The projection television set of claim 5 wherein the projection lens system includes at least one plastic lens element and the combination of the cathode ray tube and the projection lens system is substantially athermalized.

7. A projection television set comprising three cathode ray tubes, a screen, and three projection lens systems, one projection lens system being associated with each of the cathode ray tubes for projecting light from that tube onto the screen to form an image, each projection lens system comprising the projection lens system of claim 1.

8. The projection television set of claim 7 wherein each projection lens system includes at least one plastic lens element and each combination of a cathode ray tube and a projection lens system is substantially athermalized.

9. A projection television set comprising a cathode ray tube which has a surface-to-be-projected which is spherical, a screen, and a projection lens system for projecting light from the cathode ray tube onto the screen to form an image, said projection lens system consisting, from its long conjugate to its short conjugate, of:

(a) a first lens element which has (i) a weak optical power and (ii) at least one aspherical surface;

(b) a second lens element which (i) has a positive focal length $f_2$ and (ii) provides most of the optical power of the lens system;

(c) a third lens element which has (i) a positive focal length $f_3$ and (ii) at least one aspherical surface; and (d) a fourth lens unit which (i) consists of a lens element, coupling fluid, and the faceplate of the cathode ray tube, (ii) has a strong negative optical power, and (iii) provides most of the correction of the field curvature of the lens system;

and which further consists of:

(e) a corrector lens element which is located adjacent to the second lens element and has (i) a weak optical power and (ii) at least one aspherical surface;

wherein:

$2 < f_3/f_2 < 4$, $|f_c/f_3| > 3$, and max\|z\|/$r_{ca}$ < 0.15 where $f_c$ is the focal length of the corrector lens element, max\|z\| is the maximum sag of the two surfaces of the corrector lens element, and $r_{ca}$ is the clear aperture radius of the surface having the maximum sag.

10. A projection television set comprising three cathode ray tubes, each of which has a surface-to-be-projected which is spherical, a screen, and three projection lens systems, one projection lens system being associated with each of the cathode ray tubes for projecting light from that tube onto the screen to form an image, each projection lens system consisting, from its long conjugate to its short conjugate, of:

(a) a first lens element which has (i) a weak optical power and (ii) at least one aspherical surface;

(b) a second lens element which (i) has a positive focal length $f_2$ and (ii) provides most of the optical power of the lens system;

(c) a third lens element which has (i) a positive focal length $f_3$ and (ii) at least one aspherical surface; and (d) a fourth lens unit which (i) consists of a lens element, coupling fluid, and the faceplate of the cathode ray tube, (ii) has a strong negative optical power, and (iii) provides most of the correction of the field curvature of the lens system;

and which further consists of:
  (e) a corrector lens element which is located adjacent to the second lens element and has (i) a weak optical power and (ii) at least one aspherical surface;
wherein:

$2 < f_3/f_2 < 4$, $|f_c/f_3| > 3$, and $\max|z|/r_{ca} < 0.15$ where $f_c$ is the focal length of the corrector lens element, $\max|z|$ is the maximum sag of the two surfaces of the corrector lens element, and $r_{ca}$ is the clear aperture radius of the surface having the maximum sag.

* * * * *

UNITED STATES PATENT AND TRADEMARK OFFICE
CERTIFICATE OF CORRECTION

PATENT NO.    : 6,509,937 B1
DATED         : January 21, 2003
INVENTOR(S)   : Moskovich, Jacob It is certified that error appears in the above-identified patent and that said Letters Patent is hereby corrected as shown below:

<u>Column 11,</u>
Table 3, under the subheading "Thickness" entry 10, delete "4.90000" and insert -- 4.00000 --, therefor.
Table 3, under the heading "Even Polynomial Aspheres", and the subheading "E"), entry 1, delete "-6.4068E-09" and insert -- -6.4068E-10 --, therefor. and
Table 3, entry 3, delete "2.9676E-10" and insert -- 2.0676E-10 --, therefor.
Table 3, under the heading "First Order Properties of Elements", and subheading "Power"), entry 1, delete "0.84998E-02" and insert -- 0.84998E-03 --, therefor.
Table 5, under the heading "Radius", entry 13, delete "-350.0900" and insert -- -350.0000 --, therefor.

Signed and Sealed this

Third Day of August, 2004

JON W. DUDAS
*Acting Director of the United States Patent and Trademark Office*